United States Patent [19]

Anderson

[11] 4,207,095
[45] Jun. 10, 1980

[54] MATERIAL AND METHOD FOR OBTAINING HYDROGEN BY DISSOCIATION OF WATER

[75] Inventor: Eugene R. Anderson, Wills Point, Tex.

[73] Assignee: Horizon Manufacturing Corporation, Wills Point, Tex.

[21] Appl. No.: 902,705

[22] Filed: May 4, 1978

[51] Int. Cl.² .............................................. C01B 1/08
[52] U.S. Cl. .................................. 75/134 N; 75/169; 423/657
[58] Field of Search ............... 75/169, 134 N; 423/657

[56] References Cited

U.S. PATENT DOCUMENTS

| | | | |
|---|---|---|---|
| 2,837,408 | 6/1958 | Sakowski | 23/184 |
| 2,991,176 | 7/1961 | Clancy | 75/169 |
| 3,181,848 | 5/1965 | Miller | 266/34 |
| 3,313,598 | 4/1967 | Glackstein | 23/211 |
| 3,343,948 | 9/1967 | Raclot | 75/138 |
| 3,490,871 | 1/1970 | Miller et al. | 23/210 |
| 3,540,854 | 11/1970 | Brooke, Jr. et al. | 23/282 |
| 3,833,357 | 9/1974 | Bianchi et al. | 75/121 |
| 3,985,866 | 10/1976 | Oda et al. | 423/657 |

FOREIGN PATENT DOCUMENTS 7100847  3/1972  France ..................................... 423/657

Primary Examiner—L. Dewayne Rutledge
Assistant Examiner—Upendra Roy
Attorney, Agent, or Firm—Gerald G. Crutsinger; John F. Booth; Harry C. Post, III

[57] ABSTRACT

A material and method of use thereof is disclosed which produces hydrogen by decomposition of water. The material is an amalgam of an alkali metal, mercury and aluminum and hydrogen is produced by contacting water therewith.

4 Claims, No Drawings

MATERIAL AND METHOD FOR OBTAINING HYDROGEN BY DISSOCIATION OF WATER

BACKGROUND OF THE INVENTION

1. Field of the Invention

This invention relates to a material for and method of effecting the decomposition/dissociation of water to form hydrogen. The water is reacted with an amalgam of sodium, aluminum and mercury to form hydrogen and a metallic hydroxide believed to be $Na_3Al(OH)_6$.

2. Description of the Prior Art

It is well known that alkali metals react with water to form hydrogen and the stable alkali hydroxide. The foregoing reaction is rapid, the heat generated intense and the hydrogen formed generally ignites with explosive force. The result is an unsatisfactory and dangerous method of generating hydrogen. Moreover, the resulting alkali metal hydroxide is very stable and regeneration to form the alkali metal is not practical from an economic standpoint.

A simple and facile method of producing hydrogen without spontaneous combustion of the resultant evolved hydrogen where an alkali metal is used has not heretofore been developed.

SUMMARY OF THE INVENTION

In its broadest aspect, the material found as suitable for generation of hydrogen from water without spontaneous combustion of the resultant evolved hydrogen comprises an amalgam of (1) an alkali metal such as lithium, sodium, potassium, cesium or combinations thereof, (2) aluminum and (3) mercury.

The particle size of the sodium and aluminum is such as to facilitate formation of an amalgam. The amalgam has been prepared utilizing sodium of about ¼ inch diameter and aluminum within the range of about 10 to about 100 mesh. The particle size of either the alkali metal or the aluminum is not critical since the foregoing metals and mercury readily intermix. The smaller the particle size, of course, the more rapid the mixing.

The atomic weight ratio of alkali metal to mercury is from about 1:100 to about 100:1 and the atomic weight ratio of alkali metal to aluminum is from about 1:100 to about 100:1. Preferably the atomic weight ratio of alkali metal to mercury is from about 3:1 to about 1:1.5 and the atomic weight ratio of alkali metal to aluminum is from about 1:1 to about 3:1.

Although not wishing to be bound by the following explanation, it is believed that the water reacts with the alkali metal, e.g., sodium, and the aluminum liberating hydrogen to form $Na_3Al(OH)_6$. The reaction of the water with the amalgam is substantially different from the reaction of the alkali metal component of the amalgam with water. The heat generated by reaction of equivalent amounts of alkali metal in the form of the amalgam is substantially less than where the alkali metal along is reacted with water. Accordingly, spontaneous combustion of the hydrogen in an oxidizing environment as well as the formation of a highly stable sodium product is avoided where the amalgam of the invention is employed in place of the alkali metal alone.

The process may be depicted as follows:

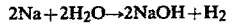

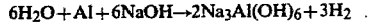

The amalgam of sodium, aluminum and mercury is prepared utilizing any known procedure for amalgamation with the added important proviso that an inert atmosphere be maintained during amalgamation. Amalgamation may be facilitated by utilization of an elevated temperature preferably around 200° C.±10° C. The amalgam is preferably maintained at this elevated temperature for about 10 minutes where 100 grams are being processed and the time is extended about a minute for each additional 100 gram aliquot.

The resulting amalgam is cooled, generally to room temperature, utilizing an inert atmosphere. For this purpose, either helium or nitrogen are satisfactory. Cooling is preferably effected in a dessicator to insure that no water contacts the amalgam.

Upon cooling, the amalgam solidifies and may be contacted with water by submersion, by spraying the water thereupon, by impinging water in the form of steam thereon or in any other manner. Contact of water at a temperature above 0° C. produces evolution of hydrogen.

Examples of suitable amalgams are as follows:

Aluminum 37.7 weight per cent, sodium 32.1 weight per cent and mercury 30.2 weight per cent.

Aluminum 22.9 weight per cent, sodium 18.4 weight per cent, mercury 58.7 weight per cent.

Aluminum 19.4 weight per cent, sodium 31.1 weight per cent, mercury 49.5 weight per cent.

EXAMPLE

Preparation of Amalgam 35.144 parts by weight of sodium, 13.749 parts by weight of aluminum and 51.107 parts by weight of mercury are formed into an amalgam in an inert atmosphere of nitrogen at an elevated temperature of 200° C. in a graphite crucible.

The resulting amalgam is cooled to room temperature in a dessicator in an inert nitrogen atmosphere. Thereafter, the amalgam is formed which is a solid but which will liquefy upon agitation.

It is important to note that the amalgam should be prepared in an inert gas atmosphere to prevent premature hydroxide formation.

Use of Amalgam

The amalgam is placed in a suitable container with one surface thereof exposed. Water is sprayed upon the exposed surface or alternatively the exposed surface may be covered entirely with a layer of water. It is necessary that the amalgam be placed within a container because in the course of contact of the amalgam with water the heat generated during the course of hydrogen generation transforms the amalgam to liquid form. The amalgam regardless of how it is contacted with water will not cause an explosion.

I claim:

1. A material for the generation of hydrogen from water which comprises an amalgam of an alkali metal, mercury and aluminum wherein the atomic weight ratio of alkali metal to mercury is from about 3:1 to about 1:1.5 and the atomic weight ratio of alkali metal to aluminum is from about 1:1 to about 3:1.

2. The amalgam of claim 1 further characterized in that the alkali metal is sodium.

3. A method of preparing an amalgam of alkali metal, mercury and aluminum which comprises admixing said alkali metal, mercury and aluminum in an inert atmosphere at an elevated temperature followed by cooling said admixture while maintaining said inert atmosphere to form a solidified amalgam product.

4. The method of claim 3 wherein said elevated temperature is about 200° C.±10° C.

* * * * *